(12) United States Patent
Hirano et al.

(10) Patent No.: US 6,537,348 B1
(45) Date of Patent: Mar. 25, 2003

(54) METHOD OF ADSORPTIVE SEPARATION OF CARBON DIOXIDE

(75) Inventors: Shigeru Hirano, Shinnanyo (JP); Atsushi Harada, Shinnanyo (JP)

(73) Assignee: Tosoh Corporation, Shinnanyo (JP)

( * ) Notice: Subject to any disclaimer, the term of this patent is extended or adjusted under 35 U.S.C. 154(b) by 0 days.

(21) Appl. No.: 09/824,840

(22) Filed: Apr. 4, 2001

(30) Foreign Application Priority Data

Apr. 4, 2000 (JP) .................................... 2000-106709

(51) Int. Cl.⁷ ............................................ B01D 53/047
(52) U.S. Cl. .............................. 95/96; 95/114; 95/139; 95/902
(58) Field of Search ............................... 95/96–106, 139, 95/902

(56) References Cited

U.S. PATENT DOCUMENTS

| | | | | |
|---|---|---|---|---|
| 4,775,396 A | * | 10/1988 | Rastelli et al. | 95/902 X |
| 4,859,217 A | * | 8/1989 | Chao | 95/902 X |
| 5,152,813 A | * | 10/1992 | Coe et al. | 95/902 X |
| 5,531,808 A | | 7/1996 | Ojo et al. | |
| 5,587,003 A | * | 12/1996 | Bulow et al. | 95/902 X |
| 5,912,422 A | * | 6/1999 | Bomard et al. | 95/139 X |
| 5,914,455 A | | 6/1999 | Jain et al. | |
| 5,980,611 A | * | 11/1999 | Kumar et al. | 95/139 X |
| 5,993,773 A | | 11/1999 | Funakoshi et al. | |
| 6,083,301 A | * | 7/2000 | Gary et al. | 95/139 X |
| 6,143,057 A | * | 11/2000 | Bulow et al. | 95/139 X |
| 6,238,460 B1 | * | 5/2001 | Deng et al. | 95/139 X |
| 6,261,344 B1 | * | 7/2001 | Labasque et al. | 95/902 X |
| 6,270,557 B1 | * | 8/2001 | Millet et al. | 95/139 X |
| 6,273,939 B1 | * | 8/2001 | Millet et al. | 95/139 X |
| 6,309,445 B1 | * | 10/2001 | Gittleman et al. | 95/139 X |
| 6,340,382 B1 | * | 1/2002 | Baksh et al. | 95/139 X |

FOREIGN PATENT DOCUMENTS

| | | |
|---|---|---|
| EP | 0 658 364 | 6/1995 |
| EP | 0 826 631 | 3/1998 |
| EP | 0 862 936 | 9/1998 |
| EP | 0 893 157 | 1/1999 |
| GB | 1 551 348 | 8/1979 |
| JP | 5-163015 | 6/1993 |
| JP | 8-252419 | 6/1996 |
| JP | 10-310422 | 11/1998 |
| JP | 11-76810 | 3/1999 |
| JP | 11-179137 | 3/1999 |
| JP | 11-217212 | 6/1999 |
| JP | 11-253736 | 9/1999 |
| JP | 11-343112 | 12/1999 |
| JP | 2000-140549 | 5/2000 |
| JP | 2001-501166 | 1/2001 |
| WO | WO 99/05063 | 2/1999 |
| WO | WO 00/01478 | 1/2000 |

\* cited by examiner

*Primary Examiner*—Robert H. Spitzer
(74) *Attorney, Agent, or Firm*—Oblon, Spivak, McClelland, Maier & Neustadt, P.C.

(57) ABSTRACT

Adsorptive separation of carbon dioxide from a gaseous mixture comprising carbon dioxide and gases less polar than carbon dioxide comprising contacting the gaseous mixture with a zeolite adsorbent is effected wherein carbon dioxide present in the gaseous mixture as contacted with the zeolite has a partial pressure of 0.1 to 50 mmHg, and the zeolite adsorbent is a shaped product comprised of at least 95%, as determined in the basis of the moisture equilibrium adsorption value, of a low-silica type X zeolite having an $SiO_2/Al_2O_3$ molar ratio of 1.9 to 2.1. Preferably, the zeolite adsorbent is preferably ion-exchanged with lithium and/or sodium, and is prepared by a process including a step of contacting with a caustic solution a calcined product of a mixture of a low-silica type X zeolite and kaolin clay whereby the kaolin clay is converted to a low-silica type X zeolite.

21 Claims, No Drawings

METHOD OF ADSORPTIVE SEPARATION OF CARBON DIOXIDE

BACKGROUND OF THE INVENTION

(1) Field of the Invention

This invention relates to a method of removing carbon dioxide by adsorptive separation from a gaseous mixture containing carbon dioxide and gases less polar than carbon dioxide.

(2) Description of the Related Art

Carbon dioxide is contained in natural gas, exhaust gas from combustion, as well as atmospheric air although in a minor amount. Further, carbon dioxide is produced as by-product in industrial processes, for example, at a step of steam-reforming natural gas, naphtha, coke or methanol to produce hydrogen. In recent years carbon dioxide industrially produced as by-product including that contained in combustion gas has been attracting widespread attention because it causes global warming. Further, cryogenic separation of air has a problem such that a trace amount, i.e., about 300 to 400 ppm, of carbon dioxide in air is solidified upon cooling, leading to clogging an equipment such as a heat exchanger.

As the method of separating and removing carbon dioxide contained in a gas, there can be mentioned a method of chemically absorbing carbon dioxide in a solution of an alkali or amine, and a method of physically adsorbing carbon dioxide by an adsorbent such as active carbon or a zeolite. The methods of physical adsorption of carbon dioxide using a zeolite adsorbent include a temperature/pressure swing adsorption (PTSA) method and a pressure swing adsorption (PSA) method. In these methods, adsorption of carbon dioxide by a zeolite adsorbent is effected at a low temperature and a high pressure and desorption thereof from the zeolite adsorbent for the reproduction of the zeolite adsorbent is effected at a temperature higher and a pressure lower than those for adsorption. Upon desorption, the zeolite adsorbent may be purged with a gas which contains no carbon dioxide and is less adsorbed than carbon dioxide.

It is known that a zeolite adsorbent adsorbs a molecule by the interaction between the cation present in the zeolite adsorbent and the molecule. The interaction is enhanced and the amount of the molecule adsorbed increases with an increase of polarity of the molecule. For example, the descending order of interaction between the zeolite and ingredients in air is water, carbon dioxide, nitrogen, oxygen and then argon. The descending order of the amount of adsorption is also the same.

Assuming that carbon dioxide in atmospheric air is removed by adsorption, the content of carbon dioxide in air is about 300 ppm and the content of nitrogen in air is about 78%, and hence, when air is brought into contact with an adsorbent at a pressure of 5 to 10 atm., the partial pressure of carbon dioxide is about 2 mmHg and the partial pressure of nitrogen is about 4 to 8 atm. Carbon dioxide has a large polarity and, even when the partial pressure thereof is low, it should be adsorbed in a large amount. But, the amount of carbon dioxide adsorbed is small because its adsorption is hindered by the presence of a large amount of nitrogen. Note, water in air can be substantially completely removed by previously treating with an adsorbent such as alumina.

The zeolite adsorbent hitherto used for removing carbon dioxide from a gaseous mixture such as air includes a type A zeolite and a type X zeolite having an $SiO_2/Al_2O_3$ molar ratio of at least 2.5. When air is subjected to cryogenic separation by using these zeolite adsorbents, a large amount of the zeolite adsorbents must be used because the amount of air treated for cryogenic separation is very large. Therefore, to reduce the size of equipment or reduce the energy consumption, an adsorbent exhibiting a high adsorption for carbon dioxide even in the co-presence of a large amount of nitrogen is eagerly desired.

A method of removing carbon dioxide from a gas stream by using a zeolite adsorbent has been proposed in Japanese Unexamined Patent Publication (abbreviated to "JP-A") No. H8-252419 (corresponding to U.S. Pat. No. 5,531,808) wherein the gas stream is contacted with a type X zeolite having a silicon/aluminum atomic-ratio of about 1.0 to about 1.15 and having been ion-exchanged with a cation selected from the ions of group 1A, group 2A, group 3A, group 3B, the lanthanide series and mixtures thereof at a temperature of about −50° C. to about +80° C. It is noted that the change of the uptake of carbon dioxide depending upon the pressure of carbon dioxide is examined (see table on page 6 of JP-A '419 [in col. 6 of U.S. '808]), but, the selective adsorption of carbon dioxide in a gaseous mixture containing carbon dioxide and nitrogen is not examined therein.

Further, as preferable exchangeable cations, sodium and lithium falling in the ions of group 1A and calcium falling in the ions of group 2A are mentioned in JP-A '419 (U.S. '808) More specifically a sodium-exchanged type X zeolite (NaLSX) and a lithium- and calcium-exchanged type X zeolite (Li,CaLSX) (the amounts of lithium and calcium are 95 equiv. % and 5 equiv. %, respectively) are examined, and it is shown that Li,CaLSX is superior to NaLSX in the uptake of carbon dioxide, but, the adsorption selectivity between carbon dioxide and nitrogen is not examined.

A method of removing water vapor and carbon dioxide from a gas wherein water vapor is first removed and then carbon dioxide is removed by using sodium LSX zeolite as adsorbent has been proposed in JP-A H8-179,137 (corresponding to U.S. Pat. No. 5,914,455). However, this patent is silent on the removal of carbon dioxide from a gaseous mixture containing carbon dioxide and nitrogen.

A method of removing carbon dioxide from a gas such as atmospheric air wherein carbon dioxide is adsorbed by type X zeolite having an Si/Al atomic ratio of 1 to 1.5 and having been ion-exchanged with calcium, sodium and potassium has been proposed in JP-A H11-253,736.

A zeolite adsorbent for gas purification comprising a sodium-type low-silica faujasite having an $SiO_2/Al_2O_3$ of about 1.8 to 2.2 with a residual content of potassium ions less than about 8.0 equiv. % and a binder has been proposed in WO 00/01478. The zeolite adsorbent used therein has a low zeolite crystal purity and contains a binder, and hence, the adsorption performance inherently possessed by zeolite crystal is not sufficiently manifested.

In general zeolite adsorbents are used in the form of a shaped product prepared by incorporating a binder in zeolite and shaping the mixture of zeolite and the binder into a desired shape. However, a binder has no adsorption performance, and hence, the zeolite adsorbent containing a binder has a relatively poor adsorption performance. Therefore, proposals of using a binder capable of being converted to zeolite have been made. For example, a method of producing a low-silica type X zeolite binderless shaped product has been proposed in JP-A H5-163,015 wherein a shaped product comprised of a type X zeolite powder having an $SiO_2/Al_2O_3$ molar ratio of smaller than 2.5, metakaolin converted from kaolin clay, sodium hydroxide and potassium hydroxide is maintained in an aqueous solution containing sodium hydroxide and potassium hydroxide at a temperature of 40 to 100° C. for several hours to several days whereby metakaolin is converted to zeolite to give a low-silica type X zeolite binderless shaped product.

A shaped product comprised of at least 95% of a low-silica type X zeolite having an $SiO_2/Al_2O_3$ molar ratio of at least 2, which is prepared by using a binder capable of being converted to a zeolite, is described in JP-A H11-76810. This shaped product is prepared by a process wherein a low-silica type X zeolite is agglomerated by using a binder containing at least 80% of a clay capable of being converted to a zeolite; the thus-obtained agglomerate is shaped; the shaped product is dried and then calcined at a temperature of 500 to 700° C.; and the thus-obtained solid product is placed in contact with an aqueous alkali solution containing an alkali at least 0.5 molar concentration comprising sodium hydroxide and potassium hydroxide, wherein the proportion of potassium hydroxide is not larger than 30% by mole based on the sum of sodium hydroxide and potassium hydroxide. The low-silica type X zeolite shaped product has very low crush strength and contains a small amount of type A zeolite. Thus, the $SiO_2/Al_2O_3$ molar ratio as determined by chemical analysis is larger than the theoretical value, i.e., 2.0, and the low-silica type X zeolite in the shaped product has a low purity.

Further a shaped product comprised of at least 95% of a low-silica type X zeolite having an $SiO_2/Al_2O_3$ molar ratio of at least 2, which is prepared by using a binder capable of being converted to a zeolite, is described in WO 99/05063. This shaped product is prepared by a process which is similar to the above-mentioned process described in JP-A H11-76810 and in which a shaped product of an agglomerate comprised of LSX zeolite and a clay capable of being converted to zeolite is placed in contact with an aqueous alkali solution containing an alkali at least 0.5 molar concentration. This shaped product of a low-silica type X zeolite has a low crush strength, and this literature is silent on the use thereof for adsorptive separation of carbon dioxide, especially carbon dioxide from air, and suggests nothing about the adsorptive selectivity between carbon dioxide and nitrogen.

SUMMARY OF THE INVENTION

A primary object of the present invention is to provide an improved method of adsorptive separation of carbon dioxide from a gaseous mixture comprising carbon dioxide and gases less polar than carbon dioxide, for example, adsorptive separation of carbon dioxide which is a cumbersome ingredient in air when air is subjected to cryogenic separation. More particularly, it is intended by the present invention to effect the adsorptive separation of carbon dioxide by using a binderless zeolite adsorbent, which has a high strength withstanding compressive force imposed in the industrial use and which exhibits an enhanced adsorption capacity. When a zeolite ion-exchanged with a specific alkali metal cation such as sodium ion to a high degree is used, the adsorption selectivity of carbon dioxide and the efficiency of adsorptive separation thereof can be more enhanced.

In accordance with the present invention, there is provided a method of adsorptive separation of carbon dioxide from a gaseous mixture comprising carbon dioxide and gases less polar than carbon dioxide comprising contacting the gaseous mixture with a zeolite adsorbent whereby carbon dioxide is adsorbed by the zeolite to be thereby separated, characterized in that carbon dioxide present in the gaseous mixture as contacted with the zeolite adsorbent has a partial pressure in the range of 0.1 to 50 mmHg, and the zeolite adsorbent is a shaped product comprised of at least 95%, as determined on the basis of the moisture equilibrium adsorption value, of a low-silica type X zeolite having an $SiO_2/Al_2O_3$ molar ratio in the range of 1.9 to 2.1.

The shaped product preferably has been ion-exchanged with at least one kind of cation selected from lithium and sodium, more preferably with sodium, at an ion exchange ratio of at least 90%, more preferably at least 95%, and further preferably has an average crush strength of at least 1.0 kgf as measured on particles of the shaped product having a particle diameter in the range of 1.4 to 1.7 mm as prepared for crush strength measurement.

The shaped product is preferably comprised of at least 98%, as determined on the basis of the moisture equilibrium adsorption value, of the low-silica type X zeolite. More preferably the shaped product consists essentially of the low-silica type X zeolite and is substantially free from a binder.

The shaped product preferably has a macro pore volume of at least 0.25 ml/g and an average pore diameter of 0.35 $\mu$m, and it is preferably a particle having an average particle diameter in the range of 0.5 to 3 mm, more preferably of 0.5 to 2 mm.

The adsorptive separation of carbon dioxide may be effected by pressure swing adsorption (PSA) and/or temperature swing adsorption (TSA). Preferably the adsorption is carried out at a temperature of 0 to 70° C., and then desorption is carried out at a temperature of 40 to 200° C.

The shaped product can be prepared by a process comprising the steps of (i) shaping a mixture comprising a low-silica type X zeolite having an $SiO_2/Al_2O_3$ molar ratio in the range of 1.9 to 2.1 and a kaolin clay having an $SiO_2/Al_2O_3$ molar ratio in the range of 1.9 to 2.1, (ii) calcining the thus-shaped product, and then (iii) placing the calcined shaped product in contact with a caustic solution capable of dissolving silicon from the calcined shaped product in an amount larger than that of aluminum dissolved from the calcined shaped product whereby the kaolin clay contained in the calcined shaped product is converted to a low-silica type X zeolite. Preferably the calcined shaped product is kept in contact with a caustic solution of at least 6 moles per liter, for at least 10 hours, or a caustic solution of at least 8 moles per liter, for at least 5 hours. The caustic solution with which the calcined shaped product is placed in contact may contain an aluminum ingredient previously incorporated therein.

DESCRIPTION OF THE PREFERRED EMBODIMENTS

The adsorbent used in the present invention is a shaped product comprised of at least 95%, preferably at least 98%, as determined on the basis of the moisture equilibrium adsorption value, of a low-silica type X zeolite having an $SiO_2/Al_2O_3$ molar ratio in the range of 1.9 to 2.1. By the phrase "as determined on the basis of the moisture equilibrium adsorption value" used herein, we mean that the content in % of the low-silica type X zeolite in the shaped product is defined by the following equation:

$$A = [B/C] \times 100$$

where

A: content (%) of low-silica type X zeolite in shaped product,

B: moisture equilibrium adsorption value of the shaped product, and

C: moisture equilibrium adsorption of the low-silica type X zeolite having the same weight as the shaped product.

Most preferably the shaped product consists essentially of low-silica type X zeolite and is substantially free from a binder. The shaped product preferably has been ion-exchanged with at least one kind of cation selected from lithium and sodium, more preferably with sodium, at an ion exchange ratio of at least 90%, more preferably at least 95%.

As explained above, the adsorption of gas by a zeolite occurs due to the interaction between cations present in the zeolite and gas molecules, and thus, with an increase in number of cations present in the zeolite, the capacity of gas adsorption increases. The number of cations present in a zeolite molecule varies depending upon the number of aluminum in the crystal skeleton structure of zeolite, namely, as the number of aluminum increases (i.e., the $SiO_2/Al_2O_3$ molar ratio of the zeolite is reduced), the number of cations increases. The minimum value of $SiO_2/Al_2O_3$ molar ratio of zeolite is known as 2.0 by the Loewenstein theory. The low-silica type X zeolite used in the present invention has the minimum $SiO_2/Al_2O_3$ molar ratio, but, in consideration of measurement inaccuracy of chemical analysis and other factors, the zeolite used is defined as having an $SiO_2/Al_2O_3$ molar ratio in the range of 1.9 to 2.1. A type A zeolite also is known as having an $SiO_2/Al_2O_3$ molar ratio of 2.0, but its pore diameter is small, i.e., about 4 to 5 angstroms, and thus, is not advantageous for separation of gas. In contrast, the low-silica type X zeolite has a pore diameter of about 7 to 8 angstroms, and is suitable for gas separation.

The low-silica type X zeolite crystal can be synthesized by various methods. For example, methods described in JP-A H11-217212, JP-A H10-310422 and JP-A H11-343112 can be adopted.

A zeolite crystal powder has no self-binding property and hence a binder is incorporated therein to be shaped into beads, pellets or other forms for an industrial use as an adsorbent. A binder usually has no capability of adsorbing gases, and therefore, the adsorption capacity of commercially available adsorbents is poor as compared with the adsorption capacity of a zeolite crystal powder. Therefore, a binder capable of being converted to a zeolite crystal is used in the present invention to obtain a shaped product comprised of a low-silica type X zeolite having a good adsorption capacity and substantially free from a binder.

The shaped product of a low-silica type X zeolite used in the present invention can be prepared by a process described below. As a low-silica type X zeolite powder used as a raw material, those which are prepared by methods described, for example, in JP-A H11-217212, JP-A H10-310422 and JP-A H11-343112 can be mentioned. To 100 parts by weight of this low-silica type X zeolite powder, 10 to 50 parts by weight of a kaolin clay binder capable of being converted into a low-silica type X zeolite was incorporated together with an appropriate amount of water, and the resulting mixture is uniformly kneaded together. When the amount of kaolin clay is too small, the resulting shaped product does not have a high crush strength. In contrast, when the amount of kaolin clay is too large, crystallization does not proceed to the desired extent, and the low-silica type X zeolite in the resulting shaped product has a poor purity. The amount of water incorporated for kneading varies depending upon the amount of kaolin clay and a manner in which the kneaded mixture is shaped into pellets or beads. Various organic and inorganic shaping aids may be added for enhancing the shapability provided that the subsequent calcination and conversion of kaolin clay into a zeolite are not badly influenced to any appreciable extent. The mixture can be shaped into pellets, beads or other forms by an appropriate method. For example, an extrusion-pelletizing method for pellets, and a stirring or rolling method for beads can be employed.

The pellets, beads or other shaped products are dried and then calcined at a temperature of 500 to 700° C., preferably 600 to 650° C. to obtain a shaped product containing low-silica type X zeolite. The calcination is essential for enhancing the convertibility of kaolin clay into a low-silica type X zeolite. That is, kaolin clay is changed to amorphous metakaolin by calcination, which is relatively easily converted into a low-silica type X zeolite. The drying and calcination can be carried out by ordinary means using, for example, a hot-air dryer, a muffle furnace, a rotary kiln and a tubular furnace.

The calcined shaped product of a low-silica type X zeolite is then placed in contact with a caustic solution capable of dissolving silicon from the calcined shaped product in an amount larger than that of aluminum dissolved from the calcined shaped product whereby the kaolin clay contained in the calcined shaped product is converted to a low-silica type X zeolite (said treatment of contacting the calcined shaped product with the caustic solution to convert the kaolin clay binder to a low-silica type X zeolite and thus to reduce the content of binder is hereinafter abbreviated to "binderless treatment" when appropriate). The caustic solution capable of dissolving silicon from the calcined shaped product in an amount larger than that of aluminum dissolved from the calcined shaped product is, for example, a caustic solution exhibiting a higher solubility for a silicate than that for an aluminate. The solubility of a solution varies depending upon the composition and concentration thereof, and temperature, and hence, the composition and concentration of the caustic solution varies depending upon the temperature at which the contacting is effected.

The caustic solution used is preferably a solution containing sodium hydroxide and potassium hydroxide. The proportion of sodium hydroxide and potassium hydroxide is preferably such that the atomic ratio of K/(Na+K) is in the range of 0.1 to 0.4. When the atomic ratio is smaller than 0.1 or larger than 0.4, metakaolin in the shaped product is difficult to be converted into a low-silica type X zeolite to the desired extent and impurities such as type A zeolite, sodalite, type F zeolite and type E zeolite tend to be produced, and thus, a shaped product containing a low-silica type X zeolite at a desired high concentration is difficult to obtain.

The amount of an alkali metal hydroxide in the caustic solution used for the binderless treatment must be at least about 5 times of the amount required for converting the entire amount of kaolin clay contained in the low-silica type X zeolite-containing shaped product into a low-silica type X zeolite. To obtain a low-silica type X zeolite-containing shaped product with a high purity within a short period of treating time, the amount of an alkali metal hydroxide in the caustic solution is preferably at least about 10 times of the amount required for converting the entire amount of kaolin clay into a low-silica type X zeolite. However, if the amount of an alkali metal hydroxide in the caustic solution is too large, i.e., at least 30 times or larger, the production cost increases and the amounts of aluminum and silicon dissolved from the shaped product become undesirably large, which leads to reduction of crush strength of the shaped product.

In the case where a caustic solution containing sodium hydroxide and potassium hydroxide at the atomic ratio described above is used, the concentration of the sum of sodium hydroxide and potassium hydroxide in the solution is at least about 6 moles/liter and preferably at least about 8 moles/liter, for the dissolution of silicon from the calcined shaped product in an amount larger than that of aluminum dissolved from the calcined shaped product. With an increase of the caustic concentration, the amount of a silicate relative to that of an aluminate in the caustic solution is increased and the efficiency of the contact treatment therewith is enhanced. Even when the caustic concentration is about 6 moles/liter, if the time of the contact treatment is too short, metakaolin in the shaped product is difficult to be converted into a low-silica type X zeolite to the desired extent.

An aluminum ingredient can be previously incorporated in the caustic solution used for the binderless treatment. The aluminum ingredient includes soluble and insoluble ingredients, and it is not particularly limited provided that aluminum can be positively used for the formation of a low-silica type X zeolite from metakaolin. As specific examples of the aluminum ingredient, there can be mentioned sodium aluminate, and a low-silica type X zeolite, kaolin clay or other aluminum-containing solid. It is also preferable that the caustic solution used for binderless treatment and containing a residual aluminum ingredient is repeatedly used. In the case where a caustic solution having incorporated therein an aluminum ingredient is used, even when the caustic concentration is lower than that of a caustic solution containing no aluminum ingredient, the conversion of metakaolin to a low-silica type X zeolite to the desired extent can be achieved.

The binderless treatment of the shaped product with the caustic solution is carried out at a temperature of at least 40° C. The efficiency of the binderless treatment increases with an elevation of the temperature, but, a preferable treating temperature is in the range of 70 to 80° C. in view of the fact that the conversion of metakaolin to a low-silica type X zeolite is an exothermic reaction, and further in view of the limitation of heat-resisting temperature of equipment material, and the minimization of impurity production.

With an increase of the caustic concentration, the time of binderless treatment can be short. When the caustic concentration is at least 6 moles/liter and at least 8 moles/liter, the time of binderless treatment required for the conversion of metakaolin to a low-silica type X zeolite to the desired extent is usually at least 10 hours and at least 5 hours, respectively.

The manner in which the low-silica type X zeolite-containing shaped product is contacted with the caustic solution is not particularly limited. It is preferable in view of ease and efficiency that the caustic solution is passed through a fixed bed column packed with the low-silica type X zeolite-containing shaped product.

The kind of cation of a zeolite adsorbent is an important factor for the adsorptive separation of carbon dioxide. To enhance the selectivity of adsorptive separation of carbon dioxide, the caustic-treated low-silica type X zeolite-containing shaped product is preferably ion-exchanged with at least one kind of cation selected from lithium and sodium. more preferably with sodium, at an ion exchange ratio of at least 90% more preferably at least 95%. The highest adsorption selectivity of carbon dioxide is obtained by an ion-exchange with sodium at an ion exchange ratio of at least 95%.

For example, when air is subjected to cryogenic separation at a low temperature, it is preferable that the air is pre-treated with a zeolite adsorbent for the removal by adsorptive separation of carbon dioxide. In the case where the zeolite adsorbent is placed in contact with air, the pressure of air is generally in the range of about 5 to 10 atm. Atmospheric air usually contains about 300 ppm of carbon dioxide and hence the pressure of carbon dioxide is usually about 1 to 2.5 mmHg. Whereas, the air contains about 78% of nitrogen and hence the pressure of nitrogen is in the range of about 4 to 8 atm. Therefore, although the interaction between the zeolite and carbon dioxide is larger than that between the zeolite and nitrogen, the amount of adsorption of carbon dioxide is greatly influenced by nitrogen. Thus, the zeolite adsorbent used must exhibit an enhanced adsorption selectivity for carbon dioxide even when a salient amount of nitrogen is co-present. The low-silica type X zeolite-containing shaped product as ion-exchanged with an alkali according to the present invention satisfies this requirement.

The method of ion-exchanging the low-silica type X zeolite-containing shaped product with lithium and/or sodium can be conventional, and includes, for example, a batchwise method and a continuous method wherein a lithium- and/or sodium-containing solution is passed through a column packed with the low-silica type X zeolite-containing shaped product. The conditions under which the ion-exchange is effected are not particularly limited. But, a high temperature, especially 50° C. or higher, is preferable in view of the ion-exchange equilibrium and the rate of reaction. A high alkali metal hydroxide concentration, usually an alkali metal hydroxide concentration of at least 1 mole/liter, is preferable.

The lithium- and/or sodium-containing compounds used for ion-exchange are not particularly limited provided that they are soluble in water, and the compounds include, for example, chloride, nitrate, sulfate and carbonate. Lithium is expensive as compared with sodium, and hence, a lithium-containing solution can be repeatedly used by removing impurities from the solution as used for ion exchange.

The high-purity low-silica type X zeolite-containing shaped product before the ion exchange according to the present invention usually contains sodium and potassium an ion-exchangeable cations. Therefore, when the shaped product is ion-exchanged with lithium and/or sodium, it is possible that certain amounts of originally contained sodium and potassium remain in the ion-exchanged shaped product. Although the ion-exchanged shaped product contains the residual sodium and potassium, it can be used as an adsorbent according to the present invention. The ion-exchanged shaped product may contain, in addition to lithium and/or sodium, other cations such as those of calcium, magnesium or other divalent metals, and those of zinc and other transition metals.

The as-ion-exchanged shaped product is dried to some extent and then calcined at a temperature of 500 to 550° C. in dry air or nitrogen atmosphere to give an adsorbent.

The high-purity low-silica type X zeolite-containing shaped product prepared by the above-mentioned process has an extremely enhanced crush strength, namely, an average crush strength of at least 1.0 kgf as measured when the shaped product is classified into particles with a particle diameter in the range of 1.4 to 1.7 mm. Thus, the shaped product can be advantageously used under industrial conditions.

It is preferable that the high-purity low-silica type X zeolite-containing shaped product exhibits enhanced rates of adsorption and desorption for carbon dioxide, in addition to a high equilibrium adsorption of carbon dioxide. For example, in the case where the adsorptive separation of carbon dioxide from atmospheric air is effected by using a zeolite adsorbent, the rates of adsorption and desorption are influenced by a macro-pore structure of the zeolite adsorbent. The macro-pores are formed among the zeolite crystal particles, and the mass transfer rate is controlled by the macro-pores. Therefore, a large pore volume and a large pore diameter are preferable. The high-purity low-silica type X zeolite-containing shaped product prepared by the above-mentioned process has a macro pore volume of at least 0.25 ml/g and an average pore diameter of at least 0.35 $\mu$m. Therefore, there can be obtained a mass transfer rate at which the adsorption capacity inherently possessed by the adsorbent is not reduced. If the macro pore volume and the average pore diameter are smaller than the above values, the mass transfer rate is not sufficiently high and the adsorption capacity inherently possessed by the adsorbent cannot be manifested.

The shaped product used in the present invention can be in the form of pellets or beads, and preferably has an average particle diameter in the range of 0.5 to 3 mm, more preferably 0.5 to 2 mm. At an average particle diameter of larger than 3 mm, the surface area per unit volume of the adsorbent-packed bed is small, and the mass transfer rate within each particle is reduced to an undesirable extent. At an average particle diameter of smaller than 0.5 mm, the pressure drop of the adsorbent-packed bed is too large and the energy consumption is undesirably increased. The average particle diameter can be determined by an ordinary method which includes, for example, a sieving method and a method by calculating from the pressure loss when a gas stream is passed through the adsorbent-packed bed according to the Ergun equation.

The adsorptive separation of carbon dioxide using the above-mentioned low-silica type X zeolite-containing adsorbent according to the present invention can be effected by a pressure swing adsorption method wherein the pressure is repeatedly increased and reduced, or a temperature swing adsorption method wherein the temperature is repeatedly elevated and lowered, or a combination of the pressure swing adsorption method with the temperature swing adsorption method.

The adsorption and desorption of carbon dioxide are preferably carried out at a temperature in the range of 0 to 70° C. and 40 to 200° C., respectively.

Thus, when the adsorptive separation of carbon dioxide is conducted by using the above-mentioned high-purity low-silica type X zeolite adsorbent according to the method of the present invention, a high adsorption selectivity is obtained, a mall-size separation apparatus can be employed, and the energy consumption is reduced.

In the method of the present invention, carbon dioxide is separated from a gaseous mixture comprising carbon dioxide and gases less polar than carbon dioxide. Carbon dioxide has a strong polarity, and thus, most gases other than carbon dioxide are less polar than carbon dioxide, which include, for example, hydrogen, oxygen, nitrogen and argon. Hence, the method of the present invention can be employed, for example, for purification of air when cryogenic separation of air is conducted, or for purification of natural gas.

The adsorptive separation of carbon dioxide can be advantageously effected when carbon dioxide present in a gaseous mixture such as air or natural gas has a partial pressure of 0.1 to 50 mmHg as contacted with the high-purity low-silica type X zeolite adsorbent. When the partial pressure of carbon dioxide is too low, the adsorption efficiency is greatly reduced. In contrast, when the partial pressure of carbon dioxide is too high, the saturated adsorption is reached in too short time, making difficult to effect a conduct adsorption-desorption cycle and a continuous operation. Further, the too high partial pressure of carbon dioxide imposes a too high load to a pump, increases energy consumption and equipment cost.

The invention will now be described more specifically by the following working examples that by no means limit the scope of the invention.

Evaluation of zeolite and its shaped product was conducted by the following methods.

(1) Chemical Composition

A zeolite specimen is dissolved in a mixed solvent of nitric acid and hydrofluoric acid, and concentrations of metal ions are measured by an ICP (inductively coupled plasma) emission analyzer ("Optima 3000" available from Perkin-Elmer Co.). The concentration of a metal ion is expressed by an ion equivalent ratio. For example, the concentration of Li ion in a solution containing Li ion, Na ion and K ion is expressed by the ion equivalent ratio of Li ion represented by the formula Li/(Li+Na+K).

(2) Crystal Structure

Determination is conducted by an X ray diffraction apparatus ("MXP-3" available from MacScience Co.).

(3) Moisture Equilibrium Adsorption

A zeolite specimen is dried at a temperature of higher than 60° C. is allowed to stand in a desiccator maintained at a temperature of 25° C. and a relative humidity of 80% for at least 16 hours. Then ignition loss is measured by heating the specimen at a temperature of 900° C. for 1 hour. The moisture equilibrium adsorption is calculated from the following equation.

Moisture equilibrium adsorption $(\%)=[(X_1-X_2)/X_2]\times 100$ where $X_1$ is weight as measured after standing in the desiccator but before the ignition, and $X_2$ is weight as measured after the ignition.

(4) Adsorption Capacity

Adsorption capacity of carbon dioxide and adsorption capacity of nitrogen are measured by using adsorption measurement apparatuses "BELSORP 28SA" and "BELSORP HP" both available from BEL Japan Inc. at a temperature of 25° C. or 40° C. The specimen used is kept in vacuo (under a pressure of not higher than $1\times 10^{-3}$ mmHg) at a temperature of 350° C. for 2 hours before measurement of the adsorption capacity. The respective adsorption isotherms are approximated according to the Dual-Site Langmuir equation (Ind. Eng. Chem. Res. 1996, 35, 2477–2483).

Using the thus-obtained adsorption isotherm, (i) adsorption of carbon dioxide in a single-component system of carbon oxide under a pressure of 2 mmHg is calculated, and further, (ii)-(1) adsorption capacity of carbon dioxide and (ii)-(2) adsorption selectivity of carbon dioxide in a two-component system comprising carbon dioxide and nitrogen are calculated according to an ideal adsorbed solution theory (A.I.Ch.E.J., 1965, 11, 121–127). The adsorption selectivity of carbon dioxide is calculated by the following equation.

Adsorption selectivity of carbon dioxide $(-)=(X1/PY1)/(X2/PY2)$ wherein P:

total pressure of carbon dioxide and nitrogen(=6.239 atm.)

Y1: molar fraction of carbon dioxide (=0.00042)

X1: adsorption capacity of carbon dioxide at Y1

Y2: molar fraction of nitrogen (=0.99958)

X2: adsorption capacity of nitrogen at Y2

(5) Macro-Pore Volume and Average Pore Diameter

Using a mercury-intrusion type porosimeter ("Poresizer-9310" available from Micromeritics Co.), macro-pore volume and average pore diameter of an activated adsorbent is measured in a pressure range of 1 to 30,000 psi (for pore diameter of 60 Å (angstrom) to 200 µm).

(6) Average Crush Strength

Following the testing method described in JIS-R-1608, average crush strength is measured as follows. An activated zeolite shaped product specimen in a particulate form in used. The crush strength varies depending upon the particle diameter of particulate specimen, and therefore, the specimen used herein is prepared by sieving the particulate specimen to pick up particles having a particle diameter of 1.4 to 1.7 mm. Using Kiya digital hardness tester ("KHT-20N" available from Fujiwara Laboratories), a compressive load is applied to the sieved particulate specimen by pressing a stainless steel pressing plate with a diameter of 5 mm against the specimen at a constant rate of 1 mm/sec at room temperature and atmospheric pressure, and the maximum load (unit: kgf) which the specimen can withstand is measured. The measurement is conducted on 25 specimens and the crush strength is expressed by an average value of the 25 maximum loads.

EXAMPLE 1

A stainless steel reaction vessel having an inner volume of 20 liters was charged with 10,770 g of an aqueous sodium silicate ($Na_2O$: 3.8% by weight, $SiO_2$: 12.6% by weight) solution, 1,330 g of water, 1,310 g of sodium hydroxide (purity: 99%) and 3,630 g of an aqueous solution of industrial potassium hydroxide (purity: 48%), and the content was maintained at 45° C. by a water bath while being stirred at 100 rpm. To this content, 5,390 g of an aqueous sodium aluminate ($Na_2O$: 20.0% by weight, $Al_2O_3$: 22.5% by weight) solution maintained at 40° C. was added over a period of 1 minute. Immediately after the commencement of addition, the content began to become white-turbid and gelled. Immediately before the completion of addition, the viscosity of the entire gel was increased and the slurry was partly stagnant in the upper part of the content in the reaction vessel, but, about three minutes later, the entire gel was uniformly fluidized. When the slurry was fluidized, an aqueous dispersion of 4.22 g of low-silica type X zeolite powder (ignition loss: 22.5%) in a minor amount of water was added. The amount of the low-silica type X zeolite powder added was 0.1% by weight based on the amount of the finally resulting low-silica type X zeolite. The thus-obtained slurry had a composition represented by the formula:

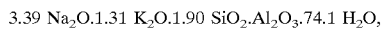

$$3.39\ Na_2O.1.31\ K_2O.1.90\ SiO_2.Al_2O_3.74.1\ H_2O,$$

and the concentration of the theoretically produced low-silica type X zeolite was 14.7% by weight. The slurry was aged at 45° C. for 4 hours while being stirred at 100 rpm. After the aging, the temperature of the slurry was elevated to 70° C. over a period of 1 hour while the stirring was continued. When the temperature reached 70° C., stirring was stopped and the slurry was subjected to crystallization at 70° C. for 8 hours. The thus-obtained crystal was filtered, washed thoroughly with pure water and then dried at 70° C. overnight.

X-ray diffraction of the obtained low-silica type X zeolite (LSX) powder revealed that it was a single phase faujasite zeolite. Chemical analysis thereof revealed that it had a composition represented by the formula:

$$0.72\ Na_2O.0.28\ K_2O.Al_2O_3.2\ SiO_2.$$

The $SiO_2/Al_2O_3$ molar ratio was 2.0 and the moisture equilibrium adsorption was 33.5%.

To 100 parts by weight of this LSX powder, 20 parts by weight of kaolin clay having a $SiO_2/Al_2O_3$ molar ratio of 2.0 ("Hydrite PXN" available from Dry Branch Kaolin Co.) was incorporated and mixed together for 15 minutes by a Mixmuller mixing machine ("MSG-15S" available from Shinto Kogyo Ltd.), and then a required amount of water was added for 15 minutes, followed by kneading for 1.5 hours. The kneaded product contained about 38% by weight of water.

The kneaded product was granulated by using a stirring-type granulator Henschel mixer ("FM/I-750" available from Mitsui Mining Co.) to give a shaped product in the form of beads having an average particle diameter of 1.6 mm and a particle diameter distribution ranging from 1.2 mm to 2.0 mm. The grains of beads were dressed by a Marumerizer molding machine ("Q-1000" available from Fuji Paudal Co. Ltd.) and then dried at 60° C. overnight. The dried beads were calcined at 600° C. for 3 hours under an air stream by using a tubular furnace (available from Advantec Co.) whereby kaolin in the beads was converted to metakaolin to give a shaped product containing low-silica type X zeolite.

A SUS304 stainless steel column having an inner volume of 13 liters was packed with 9.0 kg of the shaped product containing low-silica type X zeolite. Then the shaped product was washed with pure water at 40° C. After completion of washing, 25.2 liters of an aqueous caustic solution containing 7.2 moles/liter of NaOH and 2.8 moles/liter of KOH and maintained at 40° C. was circulated upward through the column at a rate of 560 ml/min for 3 hours. Then the temperature of the caustic solution was elevated from 40° C. to 70° C. while the solution was circulated. The circulation was continued for 6 hours at 70° C. whereby the shaped product containing low-silica type X zeolite was crystallized. The amount of the alkali metal hydroxides contained in the alkali solution was 18 times of the amount required for converting the entire kaolin clay contained in the shaped product to low-silica type X zeolite.

After recovery of the caustic solution, pure water was passed through the column to thoroughly wash the low-silica type X zeolite beads packed therein. The thus-obtained binderless shaped product containing low-silica type X zeolite in the form of beads exhibited a moisture equilibrium adsorption of 33.4% by weight, and thus, the content of a low-silica type X zeolite in the binderless shaped product was calculated as 99.7% from the moisture equilibrium adsorption value. X-ray diffraction of the low-silica type X zeolite-containing binderless shaped product revealed that it was comprised of a single phase faujasite zeolite, and diffraction attributed to impurities was not found.

The low-silica type X zeolite-containing binderless shaped product was placed in contact with an aqueous lithium chloride solution having incorporated therein lithium hydroxide to adjust the pH value to about 11, whereby a cation exchange was effected to give an Li low-silica type X zeolite-containing binderless shaped product. Chemical analysis of the binderless shaped product revealed that the Li ion exchange ratio was 98.3%, the Na ion exchange ratio was 1.3%, the K ion exchange ratio was 0.4%, and the $SiO_2/Al_2O_3$ molar ratio was 2.0. The binderless shaped product was calcined at 500° C. for 3 hours under a dry air stream in a tubular furnace (available from Advantec Co.) to be thereby activated.

Adsorption capacities of carbon dioxide and nitrogen gas from a single component gas were measured, and adsorption selectivity to carbon dioxide in $CO_2/N_2$ mixed system was evaluated. The results are shown in Table 1. The pore volume and the average pore diameter were evaluated by a mercury intrusion method, and the results are shown in Table 2. The binderless shaped product exhibited an average crush strength of 1.7 kgf as measured on particles having a particle diameter of 1.4 to 1.7 mm.

EXAMPLE 2

By the same procedures as described in Example 1, a low-silica type X zeolite-containing binderless shaped product was prepared. This binderless shaped product was placed in contact with an aqueous lithium chloride solution whereby an ion exchange was effected to give an Li low-silica type X zeolite-containing binderless shaped product. The aqueous lithium chloride solution used for ion-exchange was prepared by dissolving lithium carbonate in aqueous hydrochloric acid to obtain an aqueous lithium chloride solution having a pH value of about 7, and adding lithium hydroxide to the aqueous lithium chloride solution to adjust the pH value to about 11.

Chemical analysis of the Li low-silica type X zeolite-containing binderless shaped product revealed that the Li ion exchange ratio was 95.3%, the Na ion exchange ratio was 2.3%, the K ion exchange ratio was 1.7%, the Mg ion exchange ratio was 0.3% and the Ca ion exchange ratio was 0.4%, and the $SiO_2/Al_2O_3$ molar ratio was 2.0. The binderless shaped product was calcined at 500° C. for 3 hours under a dry air stream in a tubular furnace (available from Advantec Co.) to be thereby activated.

The adsorption performances of the Li low-silica type X zeolite-containing binderless shaped product were evaluated. The results are shown in Table 1. The binderless shaped product had an average crush strength of 1.5 kgf as measured on particles having a particle diameter of 1.4 to 1.7 mm.

EXAMPLE 3

By the same procedures as described in Example 1, a low-silica type X zeolite-containing binderless shaped product was prepared. This binderless shaped product was placed in contact with an aqueous sodium chloride solution having added thereto sodium hydroxide to adjust the pH value to about 11. whereby an ion exchange was effected to give an Na low-silica type X zeolite-containing binderless shaped product.

Chemical analysis of the Na low-silica type X zeolite-containing binderless shaped product revealed that the Na ion exchange ratio was 97.9% and the K ion exchange ratio was 2.1%, and the $SiO_2/Al_2O_3$ molar ratio was 2.0. The binderless shaped product was calcined at 500° C. for 3 hours under a dry air stream in a tubular furnace (available from Advantec Co.) to be thereby activated.

The adsorption performances of the Na low-silica type X zeolite-containing binderless shaped product were evaluated. The results are shown in Table 1. The binderless shaped product had an average crush strength of 1.5 kgf as measured on particles having a particle diameter of 1.4 to 1.7 mm.

EXAMPLE 4

By the same procedures as described in Example 1, a low-silica type X zeolite-containing binderless shaped product was prepared. This binderless shaped product was placed in contact with an aqueous sodium carbonate solution, whereby an ion exchange was effected to give a Na low-silica type X zeolite-containing binderless shaped product.

Chemical analysis of the Na low-silica type X zeolite-containing binderless shaped product revealed that the Na ion exchange ratio was 95.6%, the K ion exchange ratio was 3.6%, the Mg ion exchange ratio was 0.3% and the Ca ion exchange ratio was 0.5%, and the $SiO_2/Al_2O_3$ molar ratio was 2.0. The binderless shaped product was calcined at 500° C. for 3 hours under a dry air stream in a tubular furnace (available from Advantec Co.) to be thereby activated.

The adsorption performances of the Na low-silica type X zeolite-containing binderless shaped product were evaluated. The results are shown in Table 1. The binderless shaped product had an average crush strength of 1.4 kgf as measured on particles having a particle diameter of 1.4 to 1.7 mm.

EXAMPLE 5

By the same procedures as described in Example 1 except that the amount of kaolin was changed to 30 parts by weight, a low-silica type X zeolite-containing shaped product was prepared. A polypropylene column having an inner volume of 3.1 liters was packed with 2.2 kg of thus-obtained shaped product. By passing 8.1 liters of an aqueous caustic solution containing 2.2 moles/liter of NaOH and 0.9 mole/liter of KOH through the column in the same manner as in Example 1 to conduct a binderless treatment, i.e., convert kaolin in the shaped product into a low-silica type X zeolite. The amount of the alkali metal hydroxides contained in the caustic solution was 7.5 times of the amount required for converting the entire kaolin clay contained in the shaped product to low-silica type X zeolite.

Then, pure water was passed through the column to thoroughly wash the low-silica type X zeolite-containing binderless shaped product packed therein. The obtained binderless shaped product exhibited a moisture equilibrium adsorption of 30.5% by weight, and thus, the content of a low-silica type X zeolite in the binderless shaped product was calculated as 91% from the moisture equilibrium adsorption value. X-ray diffraction of the low-silica type X zeolite-containing binderless shaped product revealed that it was comprised of a faujasite zeolite and a type A zeolite.

The binderless shaped product was subjected to a Li ion exchange treatment in the same manner as in Example 1. Chemical analysis of the ion-exchanged binderless shaped product revealed that the Li ion exchange ratio was 97.9%, the Na ion exchange ratio was 1.9% and the K ion exchange ratio was 0.2%, and the $SiO_2/Al_2O_3$ molar ratio was 2.0. The binderless shaped product was calcined to be thereby activated in the same manner as in Example 1.

The adsorption performances of the Li low-silica type X zeolite-containing binderless shaped product were evaluated. The results are shown in Table 1. The pore volume and the average pore diameter were evaluated by a mercury intrusion method. The results are shown in Table 2. The binderless shaped product had an average crush strength of 1.4 kgf as measured on particles having a particle diameter of 1.4 to 1.7 mm.

EXAMPLE 6

By the same procedures as described in Example 1, a low-silica type X zeolite-containing binderless shaped product was prepared. This binderless shaped product was placed in contact with an aqueous lithium chloride solution having added thereto lithium hydroxide to adjust the pH value to about 11, whereby an ion exchange was effected. Chemical analysis of the thus-obtained Li low-silica type X zeolite-containing binderless shaped product revealed that the Li ion exchange ratio was 86.0%, the Na ion exchange ratio was 10.7% and the K ion exchange ratio was 3.3%, and the $SiO_2/Al_2O_3$ molar ratio was 2.0. Ca and Mg were not found. The binderless shaped product was calcined to be thereby activated in the same manner as in Example 1.

The adsorption performances of the Li low-silica type X zeolite-containing binderless shaped product were evaluated. The results are shown in Table 1. The binderless shaped product had an average crush strength of 1.5 kgf as measured on particles having a particle diameter of 1.4 to 1.7 mm.

EXAMPLE 7

By the same procedures as described in Example 1, a low-silica type X zeolite-containing binderless shaped product was prepared. This binderless shaped product was not subjected to an ion-exchange treatment. Chemical analysis of the thus-obtained (Na,K) low-silica type X zeolite-containing binderless shaped product revealed that the Na ion exchange ratio was 74.5% and the K ion exchange ratio was 25.5%, and the $SiO_2/Al_2O_2$ molar ratio was 2.0. Ca and Mg were not found. The binderless shaped product was calcined to be thereby activated in the same manner as in Example 1.

The adsorption performances of the (Na,K) low-silica type X zeolite-containing binderless shaped product were evaluated. The results are shown in Table 1. The binderless shaped product had an average crush strength of 1.4 kgf as measured on particles having a particle diameter of 1.4 to 1.7 mm.

EXAMPLE 8

By the same procedures as described in Example 1, a low-silica type X zeolite-containing shaped product was prepared. By using 16.2 liters of an aqueous caustic solution containing 3.0 moles/liter of an alkali (2.2 moles/liter of NaOH and 0.8 mole/liter of KOH), a binderless treatment was conducted, i.e., kaolin in the shaped product was converted into a low-silica type X zeolite in the same manner as in Example 1. The amount of the alkali metal hydroxides contained in the caustic solution was 7.5 times of the amount required for converting the entire kaolin clay contained in the shaped product to low-silica type X zeolite.

Then, pure water was passed through the column to thoroughly wash the low-silica type X zeolite-containing binderless shaped product packed therein. The obtained binderless shaped product exhibited a moisture equilibrium adsorption of 30.5% by weight, and thus, the content of a low-silica type X zeolite in the binderless shaped product was calculated as 91% from the moisture equilibrium adsorption value. X-ray diffraction of the low-silica type X zeolite-containing binderless shaped product revealed that it was comprised of a faujasite zeolite and a type A zeolite.

The binderless shaped product was subjected to a Na ion exchange treatment in the same manner as in Example 3. Chemical analysis of the ion-exchanged binderless shaped product revealed that the Na ion exchange ratio was 96.5% and the K ion exchange ratio was 3.5%, and the $SiO_2/Al_2O_3$ molar ratio was 2.0. The binderless shaped product was calcined at 500° C. for 3 hours under a dry air stream in a tubular furnace (available from Advantec Co.) to be thereby activated.

The adsorption performances of the Na low-silica type X zeolite-containing binderless shaped product were evaluated. The results are shown in Table 1. The binderless shaped product had an average crush strength of 0.6 kgf as measured on particles having a particle diameter of 1.4 to 1.7 mm.

EXAMPLE 9

By the same procedures as described in Example 1, a low-silica type X zeolite-containing binderless shaped product was prepared. This binderless shaped product was placed in contact with an aqueous calcium chloride solution having added thereto calcium hydroxide to adjust the pH value to about 11, whereby an ion exchange was effected. Chemical analysis of the thus-obtained Ca low-silica type X zeolite-containing binderless shaped product revealed that the Ca ion exchange ratio was 94.4%, the Na ion exchange ratio was 3.5% and the K ion exchange ratio was 2.1%, and the $SiO_2/Al_2O_3$ molar ratio was 2.0. Mg was not found. The binderless shaped product was calcined to be thereby activated in the same manner as in Example 1.

The adsorption performances of the Ca low-silica type X zeolite-containing binderless shaped product were evaluated. in Table 1.

EXAMPLE 10 the adsorption performances of a binderless NaX zeolite having a $SiO_2/Al_2O_3$ molar ratio of 2.5 (available from Tosoh Corporation) which has heretofore widely been used for the adsorptive separation of carbon dioxide were evaluated. The results are shown in Table 1. X-ray diffraction of this binderless NaX zeolite revealed that it was a faujasite zeolite. and diffraction attributed to impurities was not observed.

TABLE 1

| Example No. | Cation exchange ratio (%) | | Temp. (° C.) | Adsorption of carbon dioxide | | Adsorption selectivity to carbon dioxide × $10^3$ (-) |
|---|---|---|---|---|---|---|
| | | | | from single-component gas (Nml/g) | from two-component gas (Nml/g) | |
| Ex. 1 | Li | 98.3 | 25 | 60.2 | 33.7 | 2.11 |
| | | | 40 | 49.4 | 27.0 | 1.76 |
| Ex. 2 | Li | 95.3 | 25 | 56.0 | 30.5 | 1.93 |
| Ex. 3 | Na | 97.9 | 25 | 42.8 | 33.0 | 3.57 |
| | | | 40 | 28.2 | 20.1 | 2.05 |
| Ex. 4 | Na | 95.6 | 25 | 38.4 | 30.2 | 3.25 |
| Ex. 5 | Li | 97.9 | 25 | 50.3 | 28.6 | 1.78 |
| Ex. 6 | Li | 86.0 | 25 | 46.8 | 26.9 | 1.97 |
| Ex. 7 | Na | 74.5 | 25 | 22.1 | 13.2 | 1.98 |
| Ex. 8 | Na | 96.5 | 25 | 37.5 | 28.0 | 3.28 |
| Ex. 9 | Ca | 94.4 | 25 | 37.3 | 14.9 | 0.96 |
| | | | 40 | 29.9 | 11.2 | 0.80 |
| Ex. 10 | Na | 100 | 25 | 28.3 | 17.7 | 1.47 |
| | | | 40 | 17.5 | 10.9 | 1.00 |

TABLE 2

| Example No. | Pore volume (ml/g) | Average pore diameter (μm) |
|---|---|---|
| Ex. 1 | 0.27 | 0.47 |
| Ex. 5 | 0.18 | 0.30 |

What is claimed is:

1. A method of adsorptive separation of carbon dioxide from a gaseous mixture comprising carbon dioxide and gases less polar than carbon dioxide comprising contacting said gaseous mixture with a zeolite adsorbent whereby said carbon dioxide is adsorbed by said zeolite adsorbent to be thereby separated, wherein said carbon dioxide present in said gaseous mixture as contacted with said zeolite adsorbent has a partial pressure in the range of 0.1 to 50 mmHg, and said zeolite adsorbent is a shaped product which is comprised of at least 95%, as determined on the basis of the moisture equilibrium adsorption value, of a low-silica type X zeolite having an $SiO_2/Al_2O_3$ molar ratio in the range of 1.9 to 2.1, and has an average crush strength of at least 1.0 kgf as measured on particles of the shaped product having a particle diameter in the range of 1.4 to 1.7 mm prepared for crush strength measurement.

2. The method according to claim 1, wherein said shaped product of the low-silica type X zeolite has been ion exchanged with at least one kind of cation selected from the group consisting of lithium and sodium at an ion exchange ratio of at least 90%.

3. The method according to claim 1, wherein said shaped product of the low-silica type X zeolite has been ion exchanged with at least one kind of cation selected from the group consisting of lithium and sodium at an ion exchange ratio of at least 95%.

4. The method according to claim 1, wherein said shaped product of the low-silica type X zeolite has been ion exchanged with sodium at an ion exchange ratio of at least 90%.

5. The method according to claim 1, wherein said shaped product of said low-silica type X zeolite has been ion exchanged with sodium at an ion exchange ratio of at least 95%.

6. The method according to claim 1, wherein said shaped product is comprised of at least 98% by weight, as determined on the basis of the moisture equilibrium adsorption value, of said low-silica type X zeolite.

7. The method according to claim 1, wherein said shaped product is substantially free of binder.

8. The method of adsorptive separation of carbon dioxide according to claim 1, wherein the shaped product of the low-silica type X zeolite has a macro pore volume of at least 0.25 ml/g and an average pore diameter of at least 0.35 μm.

9. The method according to claim 1, wherein said shaped product of said low-silica type X zeolite is a particle having an average particle diameter in the range of 0.5 to 3 mm.

10. The method according to claim 1, wherein said shaped product of said low-silica type X zeolite is a particle having an average particle diameter in the range of 0.5 to 2 mm.

11. The method according to claim 1, wherein said gaseous mixture is contacted with said zeolite adsorbent by at least one method selected from a pressure swing adsorption method and a temperature swing adsorption method.

12. The method according to claim 1, wherein said gaseous mixture is contacted with said zeolite adsorbent at a temperature of 0 to 70° C.

13. The method according to claim 1, which further comprises desorbing said carbon dioxide from said zeolite adsorbent at a temperature of 40 to 200° C.

14. The method according to claim 1, wherein said shaped product of said low-silica type X zeolite has been prepared by the steps of:
shaping a mixture comprising a low-silica type X zeolite having an $SiO_2/Al_2O_3$ molar ratio in the range of 1.9 to 2.1 and a kaolin clay having an $SiO_2/Al_2O_3$ molar ratio in the range of 1.9 to 2.1,
calcining the product, and then
contacting the calcined shaped product with a caustic solution capable of dissolving silicon from said calcined shaped product in an amount larger than that of aluminum dissolved from said calcined shaped product whereby the kaolin clay contained in said calcined shaped product is converted to said low-silica type X zeolite.

15. The method according to claim 14, wherein said calcined shaped product is kept in contact with a caustic solution of at least 6 moles per liter, for at least 5 hours.

16. The method according to claim 14, wherein said calcined shaped product is kept in contact with a caustic solution of at least 8 moles per liter, for at least 5 hours.

17. The method according to claim 14, wherein said caustic solution contains an aluminum ingredient previously incorporated therein.

18. The method according to claim 1, wherein said shaped product consists essentially of said low-silica type X zeolite.

19. A method of adsorptive separation of carbon dioxide from a gaseous mixture comprising carbon dioxide and gases less polar than carbon dioxide comprising contacting the gaseous mixture with a zeolite adsorbent whereby carbon dioxide is adsorbed by said zeolite to be thereby separated, wherein said carbon dioxide present in said gaseous mixture as contacted with said zeolite adsorbent has a partial pressure in the range of 0.1 to 50 mmHg, and said zeolite adsorbent is a shaped product comprised of at least 95%, as determined on the basis of the moisture equilibrium adsorption value, of a low-silica type X zeolite having an $SiO_2/Al_2O_3$ molar ratio in the range of 1.9 to 2.1 and having an average crush strength of at least 1.0 kgf as measured on particles of the shaped product having a particle diameter in the range of 1.4 to 1.7 mm prepared for crush strength measurement; said low-silica type X zeolite being ion exchanged with sodium at an ion exchange ratio of at least 90%.

20. The method according to claim 19, wherein said shaped product consists essentially of said low-silica type X zeolite.

21. The method according to claim 19, wherein said shaped product is substantially free of binder.

* * * * *